No. 643,157. Patented Feb. 13, 1900.
R. RAKESTRAW.
GATE.
(Application filed Mar. 20, 1899.)
(No Model.)
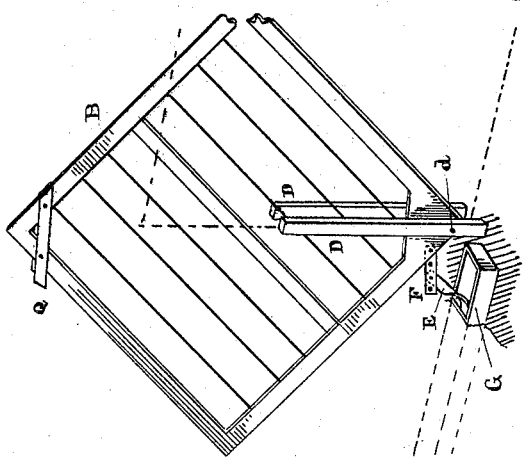
Fig. 1.
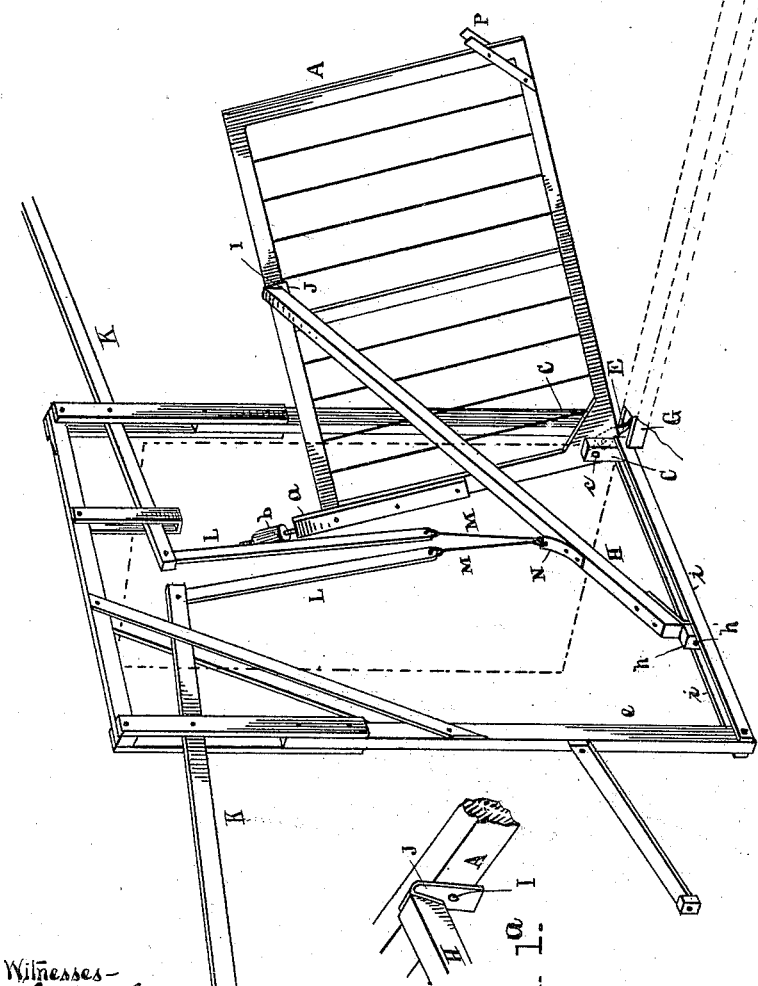
Fig. 1ª.
Witnesses—
Inventor
Roland Rakestraw
By L. M. Thurlow, Atty.
THE NORRIS PETERS CO., PHOTO-LITHO., WASHINGTON, D. C.

UNITED STATES PATENT OFFICE.

ROLAND RAKESTRAW, OF WYOMING, ILLINOIS.

GATE.

SPECIFICATION forming part of Letters Patent No. 643,157, dated February 13, 1900.

Application filed March 20, 1899. Serial No. 709,714. (No model.)

*To all whom it may concern:*

Be it known that I, ROLAND RAKESTRAW, a citizen of the United States, residing at Wyoming, in the county of Stark and State of Illinois, have invented certain new and useful Improvements in Gates; and I do hereby declare that the following is a full, clear, and exact description of the invention, which will enable others skilled in the art to which it appertains to make and use the same.

This invention relates to road-gates, and has for its object to provide a simply-constructed gate, easily manipulated, and costing but little to manufacture, and above all a gate positive in its work.

My invention consists of certain novel features of construction and peculiar combination of parts, all of which will appear hereinafter.

In the appended drawings, Figure 1 is a perspective view of the entire gate, showing the manner of operating it. Fig 1$^a$ is a perspective view of a pivotal connection between the gate and an operating-bar used in swinging said gate.

In the figures, A indicates one section of the gate, and B the other, mounted, respectively, on pivots $c$ and $d$, the former being held in upright supports C C and the latter in uprights D D. A connecting-rod E is attached at one end to the gate portion A below the pivotal point $c$, and the opposite end is attached to the portion B above the pivotal point thereof, through a link F, attached to said portion. The link is provided with a number of apertures, by which the rod E may be adjusted in order to take up any lost motion and cause the gate portion B to operate quickly and respond to the slightest movement of the portion A. Said rod E moves within a boxing G beneath the rod. Such box is closed to exclude water, snow, and other matter. To the top reach of the section A is pivoted at I by a plate J a swinging arm H, Fig. 1$^a$, pivoted at its lower extremity to a support $h$ at $h'$. One of the posts or supports C rises, as shown, and pivotally supports a lever K, having a rod or other connection L and M, attached to the arm H by an ear N, as illustrated. Opposite the lever K described is a similar one (indicated by the same reference-letter) supported by an upright $e$ and connected in like manner to the said arm H. Strips $i$ are fastened to the posts $e$, $h_1$ and $c$ and serve to keep the parts in rigid position and alinement.

At the back of the gate is attached a threaded arm $a$, having an adjustable weight B thereon to act as a counterpoise.

In operating the gate either of the levers K is depressed, thus raising the arm H and the gate portions, as shown in Fig. 1. By means of the weight the gate is carried over to the position shown by dotted lines. It is evident that by having the rod E attached below the pivotal point of the portion A the movement just described will impart a similar movement to the portion B, though in the opposite direction, by reason of the link having its pivotal point above the pivot $d$.

I provide strips P and Q on the gate portions to lock them against side play when closed.

The gate may be operated from a vehicle or when standing upon the ground and at either side of the fence. It is simple both in construction and operation and can be very cheaply made. These are certainly advantages that will be recognized by those acquainted with devices of this nature.

The device is light and wind cannot affect it, because made of thin but strong rods or twisted cables.

Various changes may be made in building my improved gate without departing from the spirit of my invention.

I am aware that it is not new to construct a gate in two portions, but I believe that the particular construction and combination of parts of my device are new.

Having thus described my invention, what I claim as new, and desire to secure by Letters Patent, is—

In a gate the combination of a long section A, a shorter section B, the former pivoted between the uprights C, the latter between the uprights D, a pivotal swinging beam H pivoted at its lower end near the ground and at one side of the gate and at the other to the top of the section A, suitable operating-levers connected therewith, as shown, an adjustable weight at the top of the said section A for the purposes explained, a rod E pivoted to the said section A near its pivotal support and extending beneath the roadway to near the opposite section B, a link F pivoted to the latter section, a series of apertures in such link for adjustment on the said rod E and pivotal connection between the rod and link all substantially as and for the purposes specified.

In testimony whereof I affix my signature in presence of two witnesses.

ROLAND RAKESTRAW.

Witnesses:
W. SCOTT,
E. CHAPMAN.